Sept. 8, 1959     E. PASTOR     2,903,220
OIL DRUM RACK
Filed Aug. 12, 1957     2 Sheets-Sheet 1
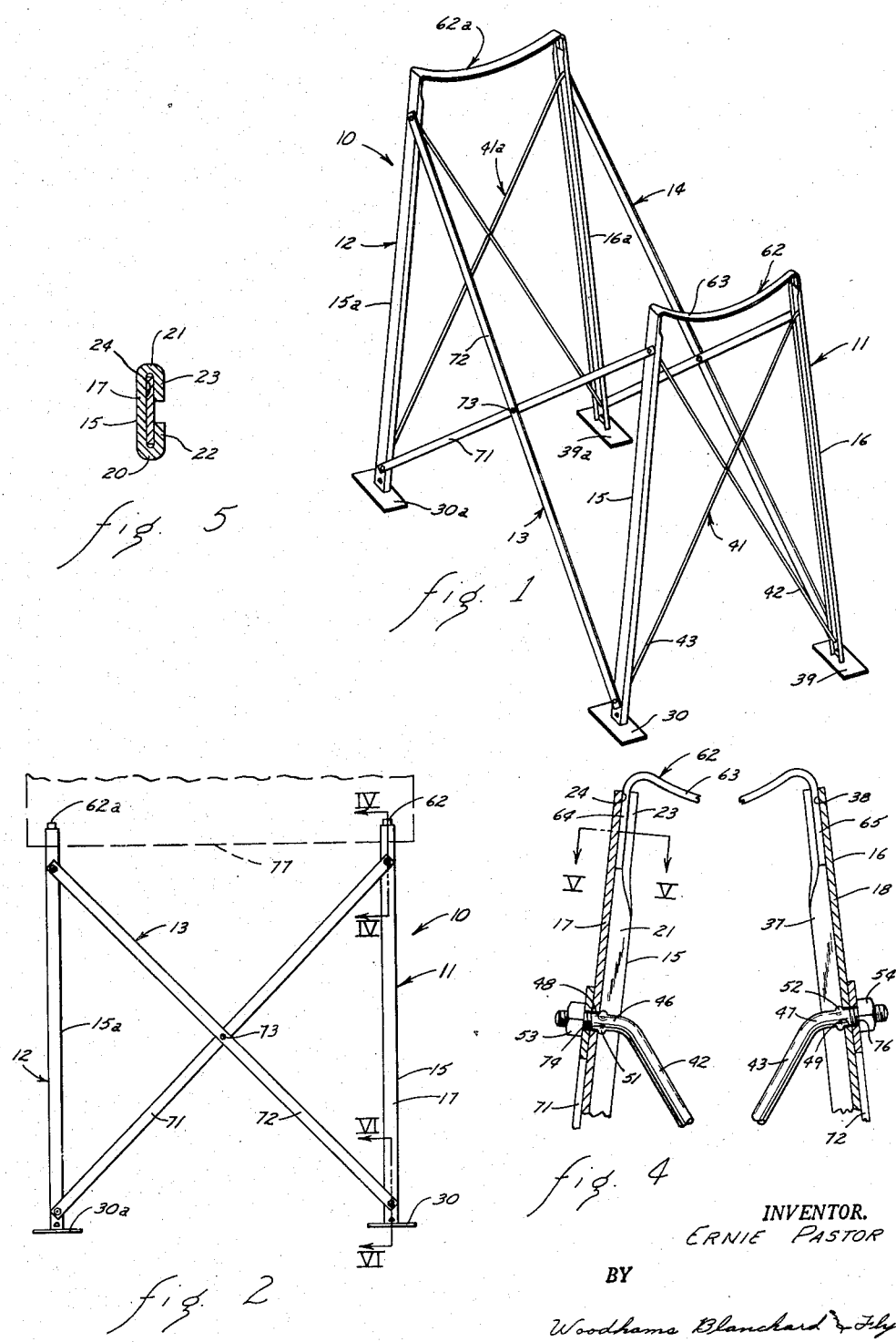
INVENTOR.
ERNIE PASTOR
BY
Woodhams Blanchard & Flynn
ATTORNEYS Sept. 8, 1959  E. PASTOR  2,903,220
OIL DRUM RACK Filed Aug. 12, 1957  2 Sheets-Sheet 2

INVENTOR.
ERNIE PASTOR
BY
Woodhams Blanchard & Flynn
ATTORNEYS

United States Patent Office 2,903,220
Patented Sept. 8, 1959

2,903,220

OIL DRUM RACK

Ernie Pastor, Marengo Township, Calhoun County, Mich.

Application August 12, 1957, Serial No. 677,473

1 Claim. (Cl. 248—150)

This invention relates in general to a rack which is capable of supporting a relatively large and heavy object, such as a fifty-five gallon drum filled with liquid fuel, and which can be easily and quickly assembled from parts which can be placed in a relatively small and compact package for easy transport.

It is a well known fact that there are many circumstances in which it is desirable, if not essential, to use a relatively small and portable supply tank for liquid fuel. For example, users of summer cottages, mobile homes and hunting lodges have often found that a fifty-five gallon drum is much better suited to their needs than a permanently installed, liquid fuel supply tank.

However, where a fuel tank of this type is used, it is usually necessary to provide a supporting rack of some type in order to provide a gravity feed from the tank to the device using the liquid fuel. Furthermore, such rack must, in many instances, be so fabricated that it can be moved or transported when not in use. For example, where the fuel tank is used with a mobile home, inability to collapse the rack quickly and easily for transport can raise serious problems, including the necessity of leaving the rack behind.

Because of the varied conditions under which racks of this type are used, it is usually advantageous, if not necessary, to transport them to their point of use in the unassembled condition, which often necessitates that the assembly be accomplished by persons unskilled in the fabrication of such racks. Thus, a rack of this type must be easy to assemble and, in view of the weight and size of objects which it supports, must not only be foolproof in such assembly but must also be strong and safe when assembled.

Because of the relatively light weight of a rack of this general type by comparison with the weight of the object which it supports, the combination of rack and object inevitably has a relatively high center of gravity. Thus, it is essential that the rack be maintained in an upright condition at all times. Accordingly, the rack must be provided with means for preventing it from sinking into the ground, particularly along one edge or at one corner of the rack. Furthermore, because said rack is usually supported upon the ground, the supporting means for said rack must be capable of adjusting itself to moderate irregularities in the ground surface.

Accordingly, a primary object of this invention is the provision of a rack for supporting an object, such as a fifty-five gallon drum, which rack can be quickly assembled and disassembled by relatively unskilled persons.

A further object of this invention is the provision of a drum supporting rack, as aforesaid, which, when disassembled, can be easily arranged in a relatively small and compact package, which is extremely easy to transport and which occupies only a very small portion of the space occupied by the fully assembled rack.

A further object of this invention is the provision of a rack, as aforesaid, which requires an absolute minimum of fastening parts for assembly, which is relatively rigid in structure when assembled, which can be assembled with nothing more than a conventional wrench, which is capable of adapting itself to slight irregularities in the terrain supporting it and which will not sink into the ground when a heavy load, such as a fifty-five gallon drum full of liquid fuel, is placed upon said rack.

A further object of this invention is the provision of a rack, as aforesaid, which can be fabricated easily and inexpensively, which is capable of withstanding relatively rough treatment and which can be assembled and disassembled frequently without affecting adversely the strength or operability of the rack.

Other objects and purposes of this invention will become apparent to persons familiar with this type of equipment upon reading the following specification and examining the accompanying drawings, in which:

Figure 1 is an oblique view of an article supporting rack characterizing the invention.

Figure 2 is a side elevational view of said article supporting rack.

Figure 4 is a sectional view taken along the line IV—IV of Figure 2.

Figure 5 is a sectional view taken along the line V—V of Figure 4.

Figure 6:
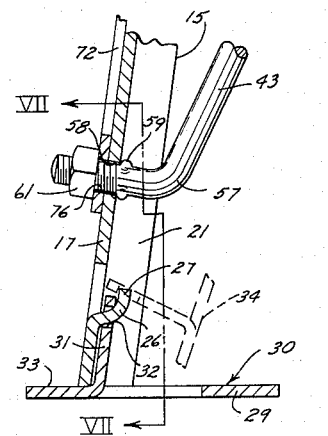
Figure 6 is a sectional view taken along the line VI—VI of Figure 2.

For the purpose of convenience in description, the terms "upper," "lower" and derivatives thereof will have reference to the rack and parts thereof in their normal positions of operation, as shown in the figures. The terms "inner," "outer" and derivatives thereof will have reference to the geometric center of said rack and parts thereof.

General description

In order to meet the objects and purposes of this invention, including those set forth above, I have provided a rack comprised of a pair of preferably identical end units or frames which are connected together with a pair of preferably identical side structures. Each end unit includes a pair of downwardly diverging legs which are interconnected by cross braces and are engaged at their upper ends by an article supporting member. A footplate is supported upon the lower end of each leg and arranged for automatically positioning itself in a wide range of attitudes with respect to its leg.

Detailed construction

As shown generally in Figure 1, the rack 10 is comprised of a pair of end units or frames 11 and 12, which are interconnected by means of the side structures 13 and 14. The end units 11 and 12 may be, and preferably are, substantially identical in size, shape and construction. Accordingly, a detailed disclosure will be given herein of the end unit 11 and such will be understood to apply in substance to the end structure 12. Parts of the end structure 12 will be designated by the same numerals, with the addition of the suffix "a," as those used on the corresponding parts in the end unit 11.

The end unit 11 (Figures 1, 2 and 3) is comprised of a pair of substantially identical, channel-shaped legs 15 and 16 having web portions 17 and 18, respectively. The leg 15 has flanges 20 and 21, which are normally parallel with each other throughout their length, but which have portions 22 and 23 (Figure 5) at the upper ends of each, respectively, which are bent toward each other into positions substantially parallel with the web 17 and spaced therefrom to provide a slot 24.

A hook element 26 (Figures 6 and 7) extends from, and is preferably integral with, the web 17 of the leg 15 near the lower end thereof. Said hook element 26, which is substantially L-shaped, extends away from the web 17 between the flanges 20 and 21, and the free end 27 of said element points upwardly.

A footplate 30 (Figures 1, 6 and 7), which has a substantially rectangular and flat base member 29, is loosely mounted upon the lower end of said leg 15. More specifically, said footplate 30 has an integral ear 31 which is preferably notched out of said base member 29 and extends substantially perpendicularly therefrom. Said ear 31 has an opening 32 through the upper end thereof through which the hook element 26 is loosely and slidably receivable. The engagement between the ear 31 and the hook element 26 permits a substantial amount of variation in the position of the footplate 30 with respect to the leg 15, whereby said footplate may adjust to variations in the terrain upon which the rack 10 is supported by said footplate 30. Furthermore, the distance between the opening 32 and the uper surface 33 of the base member 29 is preferably such that the hook element will preferably be spaced from the edge of the opening 32 when said rack 10 is in its normal load supporting position, wherein the lower end of the leg 15 engages the upper surface 33 of said base member. Thus, the element 26 is not required to support any of the weight of the rack 10 or objects supported thereon. As shown in broken lines at 34 in Figure 6, the base member 29 is held in a substantially vertical position as the ear 31 is engaged with the free end 27 of said hook element 26.

The leg 16 (Figure 3) is provided with a pair of flanges 36 and 37 having portions near the upper end thereof which cooperate with the web 18 to provide a slot 38 generally similar to the slot 24, for reasons appearing hereinafter. A footplate 39 is supported upon the lower end of the leg 16 by means of a hook 40 in substantially the same manner that the footplate 30 is supported upon the lower end of the leg 15.

The end unit 11 also includes an end brace 41, which is comprised of a pair of rods 42 and 43 which are preferably substantially identical and which are pivotally secured to each other by means of a pivot pin 44. The pivot pin 44 is preferably located closer to one end of each rod than the other end, the location on one rod being the same as on the other, and the closer ends being in this particular embodiment the upper ends of the rods. The extreme upper end portions 46 and 47 of the rods 42 and 43 are bent away from each other at an angle for reception through rod openings 48 and 49 (Figures 3 and 4), and through the webs 17 and 18, respectively, near the upper ends thereof. Said upper end portions 46 and 47 have integral, radially extending bosses 51 and 52, respectively, which are engageable with the webs 17 and 18, respectively, for limiting the distance that said rod upper portions 46 and 47 can extend through the openings 48 and 49. Said upper end portions 46 and 47 are threaded outwardly from said bosses 51 and 52 for engagement by nuts 53 and 54, respectively.

Figure 3:
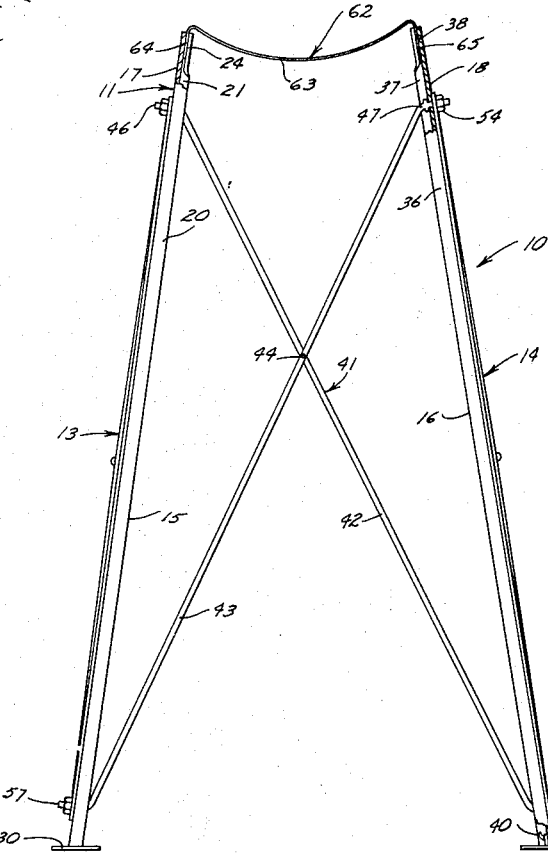
Figure 3 is an end elevational view of said article supporting rack.

In a similar manner, the lower end portions 56 and 57 (Figure 3) of the rods 42 and 43, respectively, extend through appropriate openings, such as that indicated at 58 in Figure 6, through the webs of the legs 15 and 16. Also, said end portions 56 and 57 are provided with bosses, such as those shown at 59 in Figure 6, for limiting such extension. Said lower end portions 56 and 57 are threaded for engagement by nuts, such as that shown at 61 in Figure 6, for holding the lower ends of said rods with respect to the webs 17 and 18. Because the legs 15 and 16 are preferably straight and the pivot pin 44 is located closer to the upper end of each rod than to the lower end thereof, the legs 15 and 16 are downwardly divergent when the brace rods 42 and 43 are secured in position, as shown in Figure 3. Accordingly, the lengthwise extent of the slots 24 and 38 will be upwardly convergent.

An article supporting member 62 (Figures 3 and 4), which may be an elongated flat bar, has a central portion 63 and a pair of end portions 64 and 65. The central portion 63 has a suitable article supporting upper surface, as a concave upper surface where the rack is for use with oil drums, and the end portions 64 and 65 are downwardly divergent and, therefore, snugly and slidably receivable into the slots 24 and 38, respectively. The divergence in the end portions 64 and 65 and the corresponding divergence in the legs 15 and 16 substantially prevents disengagement of the article support member 62 from the legs 15 and 16 when said legs are secured with respect to each other (Figure 3) by the end brace 41. Thus, said article support member 62 may be held in position entirely by friction and engagement with the walls of said slots 24 and 38. Furthermore, the loading on the article support member 62 is in a downward direction, thereby preventing disengagement of said member 62 from said legs when the rack 10 is loaded. The rigidity of the end unit 11 is increased by the specific cross-sectional shapes of the end portions 64 and 65, which are substantially wider than they are thick.

Although not necessary, it may be found advantageous, to fabricate the end portions 64 and 65 of the article support member 62 at a slightly different angle of divergency with respect to ecah other, than the angle of divergency of the legs 15 and 16 when the end brace 41 is secured thereto. Thus, there will be a slight binding between the end portions 64 and 65 and the interior walls of the slots 24 and 38 when the end unit 11 is in its fully assembled position. Such binding will effectively resist accidental disengagement between the article support member 62 and the legs 15 and 16 and, at the same time, give added rigidity to the end unit. A similar arrangement may, of course, be provided in the end unit 12.

The end unit 12 is provided with legs 15a and 16a (Figure 1) which are interconnected by an end brace 41a and an article support member 62a, the lower ends of said legs 15a and 16a being engaged by the footplates 30a and 39a.

The side structure 13 (Figures 1 and 2) is comprised of a pair of intersecting, centrally pivoted and elongated brace bars 71 and 72, which are pivotally connected to each other by a pivot pin 73. The upper end of the brace bar 71 has an opening 74 (Figure 4) through which the upper end portion 46 of the brace rod 42 is slidably receivable for engagement by said nut 53, whereby said brace bar 71 is held with respect to the leg 15. The lower end of the brace bar 72 is provided with an opening 76 (Figure 6) through which the lower end 57 of the brace rod 43 is slidably receivable for engagement by the nut 61, whereby said brace bar 72 is held with respect to the lower end of the leg 15. In a similar manner, the upper end of the brace bar 72 and the lower end of the brace bar 71 are secured with respect to the leg 15a of the end unit 12.

The side structure 14 is secured to, and extends between, the legs 16 and 16a of the end units 11 and 12, respectively, in a manner substantially as set forth above with respect to the side structure 13. Accordingly, it will be seen that the entire rack 10 may be assembled, and held rigidly together, by making only eight threaded connections and only four sliding connections, and then hanging the four footplates on their respective hook elements. Thus, the complete assembly or disassembly of my rack can be effected quickly and easily by making or releasing a minimum of connections.

Assembly

As indicated in the above detailed description, assembly of the rack 10 can be effected very simply and very quickly by using a conventional wrench. In fact, said rack can be assembled, at least temporarily, without any tools whatsoever. Under normal circumstances, such assembly is effected by first inserting the end portions 64 and 65 (Figure 3) of each article support member 62 and 62a into the slots 24 and 38 in the upper ends of the respective legs 15, 15a, 16 and 16a. Due to the snug, but slidable, fit between the end portions 64 and 65 and the walls of the corresponding slots 24 and 38, the article support members 62 and 62a will provide adequate means for holding the legs in each end unit with respect to each other while the end braces 41 and 41a are being assembled with their respective legs.

Considering the end unit 11, for example, the end brace structure 41 will be disposed between the legs 15 and 16 after which the upper ends 46 and 47 of the brace rods 42 and 43, respectively, will be inserted through the openings 48 and 49, respectively, in the webs 17 and 18. This may be accompanied, or followed, by a corresponding insertion of the lower ends 56 and 57 of the brace rods 42 and 43, respectively, through their corresponding rod openings at the lower ends of the webs 17 and 18. The upper end portion 46 of the rod 42 is also inserted through the opening 74 in the upper end of the brace bar 71 of the side brace structure 13. The nut 53 is then screwed onto the upper end portion 46 until the web 17 and the upper end of the brace bar 71 are snugly held between the bosses 51 on the brace rod 42 and said nut 53. In a similar manner, the other three brace bars in the two side brace structures 13 and 14 are connected to the remaining upper and lower end portions 47, 56 and 57 of the brace rods 42 and 43, thereby completing the assembly of the end unit 11 and its connection to the side brace structures 13 and 14.

The end unit 12 is now assembled by connecting the article support member 62a to the legs 15a and 16a after which the end brace structure 41a is connected not only to the legs 15a and 16a but also to the corresponding adjacent ends of the brace bars in the side brace structures 13 and 14, in a manner substantially identical to that set forth above with respect to the end unit 11.

Figure 7:
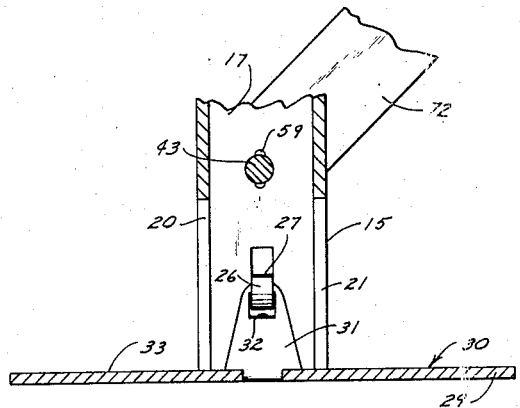
Figure 7 is a sectional view taken along the line VII—VII of Figure 6.

The footplate 30 (Figure 6) is then placed in its broken line position 34 so that the hook element 26 is received through the opening 32 in the ear 31, after which the footplate 30 is then pivoted into its solid line position, as shown in Figures 6 and 7. The remaining footplates 30a, 39 and 39a, are mounted upon the lower ends of their respective legs, 15a, 16 and 16a, in substantially the same manner. The connection of the ear 31 with the hook element 26 on each of said legs is in the nature of a universal joint, which provides for a substantial amount of movement of said footplates with respect to their legs, whereby said footplates can automatically adjust to the terrain upon which the rack 10 is to be supported. However, the location of each hook element 26 with respect to the lower end of its respective leg and the arrangement of the ear 31 associated therewith are such that the hook elements 26 prevent disconnection of the footplates from their corresponding legs without having to carry any of the weight of the rack 10 when supported upon said footplates. That is, the legs of the supporting rack 10 positively engage the upper surfaces 33 of the base members 29 when the rack 10 is in operating position.

The end braces 41 and 41a cooperate with their respective support members 62 and 62a to hold the legs of the respective end units 11 and 12 in their divergent positions, as shown in Figure 1. Although the article support member 62, for example (Figures 3 and 4), is slidably engaged by the upper ends of the legs 15 and 16, disengagement between said article support member 62 and said legs cannot be effected after the end unit 11 is assembled, as set forth above, unless some part of said end unit, such as the end brace structure 41 or said article support member 62 is disassembled, or is severely distorted. Furthermore, the direction in which the article support member 62 must be moved, namely upwardly, in order to effect such disengagement, even allowing for the possibility of such distortion, is in the opposite direction from which the forces will normally be applied to said support member 62 when a liquid fuel drum, such as that shown in broken lines at 77 in Figure 2, is being supported upon the rack 10. Accordingly, even if such disengagement could be effected, it is extremely unlikely that it would occur under normal operating conditions, unless positively and intentionally urged.

As shown in Figure 5, the support member 62 is preferably fabricated from bar stock which is substantially wider than thick. Accordingly, due to the relatively snug embracing of the end portions 64 and 65 (Figure 3) by the upper ends of the flanges and webs of the legs 15 and 16, it is practically impossible to effect any rotation of said legs with respect to the article support member without distorting the article support member 62 or said legs. This arrangement imparts additional, very substantial rigidity to the end units 11 and 12. The side brace structures 13 and 14, which can be varied substantially in specific details within this invention, are required primarily for maintaining the spacing between, and tying together, the two end units 11 and 12. The crosstying which is provided by the particular bracing disclosed herewithin, also operates effectively to prevent endwise collapse of the supporting rack 10, in a rather conventional manner. However, it will be noted that the same connecting means used to mount the end brace structures 41 and 41a in the end units 11 and 12, respectively, is also used for connecting the side brace structures 13 and 14 between, and to, said end units 11 and 12. Accordingly, a very substantial saving is provided both in the time and materials required for constructing and assembling this rack.

Although a particular preferred embodiment of the invention has been disclosed hereinabove for illustrative purposes, it will be recognized that variations or modifications thereof, which lie within the scope of the appended claim, are fully contemplated.

I claim:

A collapsible and portable article supporting rack comprising: a pair of similar end frames, each frame having a pair of downwardly divergent legs rigidly held with respect to each other by a pair of interconnected cross brace rods; a pair of similar article support members, one being associated with each said end frame and means at the upper ends of said legs for slidably engaging the opposite end portions of said support members, said end portions being divergent in approximately the same amount as the divergency of said legs; a pair of side brace structures extending between the corresponding legs of said end frames and removably secured thereto by means on said brace rods; a foot plate associated with the lower end of each leg, each foot plate having a relatively flat base member and an integral ear extending substantially perpendicularly out of the plane of said base member, said ear having an opening therethrough near the outer end thereof; and wherein each said leg has, near the lower end thereof, an inwardly and upwardly extending hook element loosely receivable through said opening in said ear for supporting said footplate with respect to said leg, said footplate being freely movable into a variety of attitudes with respect to said leg when said ear is engaged by said hook, and said leg being engageable with said base member while said ear is engaged by said hook and said base member is approximately perpendicular to said leg.

References Cited in the file of this patent
UNITED STATES PATENTS

| | | |
|---|---|---|
| 1,589,507 | Bond | June 22, 1926 |
| 1,732,829 | Boardman | Oct. 22, 1929 |
| 1,850,687 | Pascoe | Mar. 22, 1932 |
| 1,876,983 | Lidseen | Sept. 13, 1932 |
| 1,973,226 | Rose | Sept. 11, 1934 |
| 2,658,703 | Brink | Nov. 10, 1953 |